United States Patent [19]

Alexandrino

[11] 4,044,535
[45] Aug. 30, 1977

[54] NON-SOIL PENETRATING HARVESTING BLADE FOR SUGAR CANE

[76] Inventor: Victor M. Alexandrino, Box 882, Fajardo, P.R. 00648

[21] Appl. No.: 642,548

[22] Filed: Dec. 19, 1975

[51] Int. Cl.² ............................................. A01D 35/12
[52] U.S. Cl. ...................................... 56/15.8; 56/192; 56/295
[58] Field of Search ............... 56/295, 255, 15.8, 13.9, 56/192, 53-100

[56] References Cited

U.S. PATENT DOCUMENTS

| | | | |
|---|---|---|---|
| 3,389,464 | 6/1968 | Pederzoli et al. | 56/295 X |
| 3,395,522 | 8/1968 | Zweegers | 56/295 |
| 3,599,404 | 8/1971 | Fernandez et al. | 56/12.8 |
| 3,905,182 | 9/1975 | Geier | 56/13.6 |
| 3,911,651 | 10/1975 | Schreiber | 56/98 |

Primary Examiner—Russell R. Kinsey
Attorney, Agent, or Firm—Berman, Aisenberg & Platt

[57] ABSTRACT

A non-soil penetrating sugar cane harvesting blade assembly adapted to be connected to a tractor tool bar and consisting of top and bottom circular housing members with a rigidly-connected central shaft on which is journalled a disc member extending beyond the rim portion of the housing members and having cutting blades secured to its periphery. A ground-engaging skid is secured to the bottom housing member and maintains the cutting blades at a constant cutting height. A hydraulic motor is mounted on the top housing member and is drivingly connected to the disc member. The disc and housing members are linearly guided for upward and downward movement relative to the tool bar, and are biased downwardly by a spring acting between the top housing member and the tool bar and supported on an upstanding post member secured on the top housing member. One or more shock absorbers cushion relative movement of the cutter housing assembly with respect to the tool bar. The disc has asbestos-lined peripheral guide rings located respectively above and below the rim portion of the housing members.

15 Claims, 10 Drawing Figures

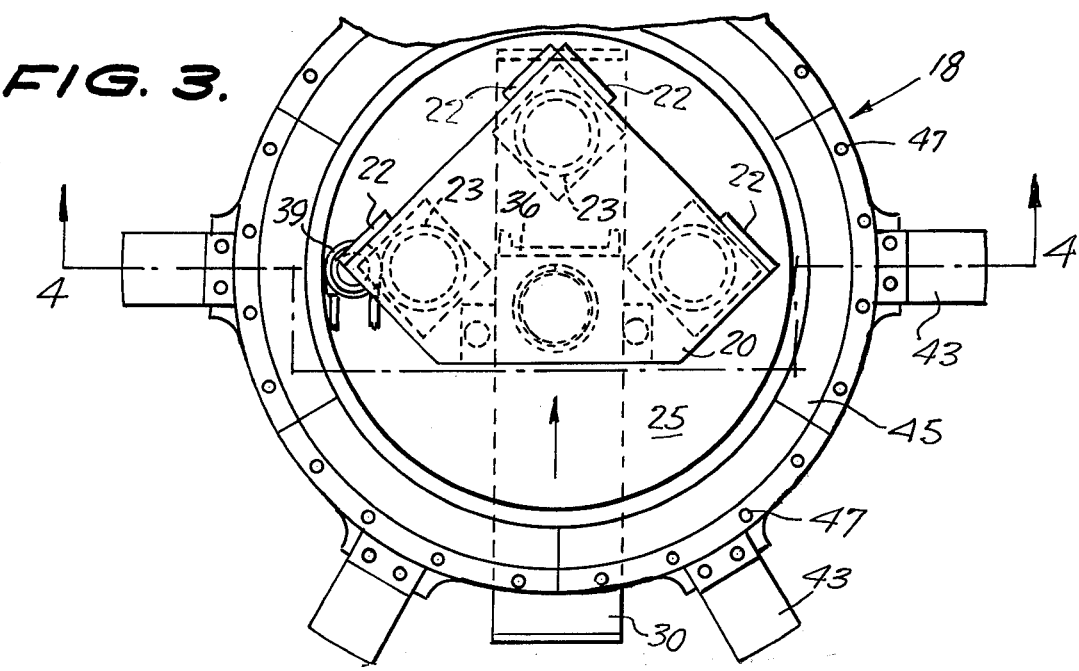
FIG. 3.
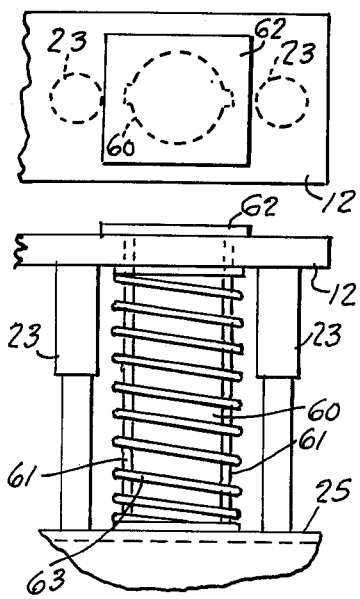
FIG. 8.
FIG. 9.

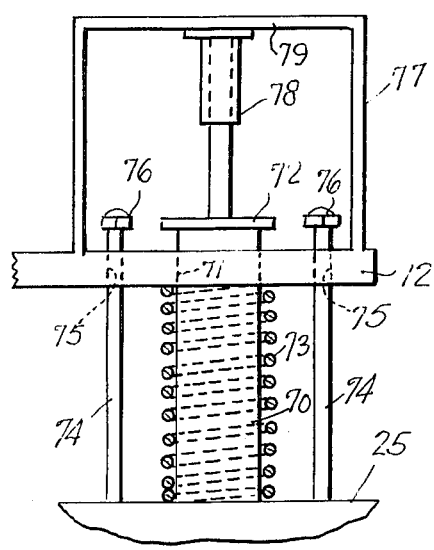

NON-SOIL PENETRATING HARVESTING BLADE FOR SUGAR CANE

This invention relates to harvesting machines, and more particularly to machines for harvesting sugar cane.

A main object of the invention is to provide a novel and improved sugar cane harvesting blade assembly which will cut sugar cane stems close to the level of the soil but will not penetrate below soil level, whereby to cut the sugar cane at the most economically desirable point without risk of damage to the plant subsoil structure and without uprooting the plant.

There are many different types of sugar cane harvesting machines on the market. All sugar cane harvesting machines in the United States and in other sugar cane producing countries have a rotating cutting disc or circular blade to cut the sugar cane stems as near to the soil level as possible. In all cases the disc or blade has to be controlled with great precision to avoid penetration underneath the soil with consequent uprooting of sugar cane stools (clusters of stems) or to avoid cutting the stems too high above the soil. The blade control is very difficult and one can never guarantee a uniform cutting of the stems according to the desired conditions. Uprooting of stools has a noxious effect on subsequent crops. With a newly planted sugar cane field, after the first harvesting, subsequent crops of ratoons are obtained through germination of the stools left in the soil. In this way, a field of sugar cane can yield four, five, six, or more ratoon crops from the first planting. Uprooting by mechanical harvesting, or other factors, lessens the field population, with resultant decrease in tonnage. To restore the desired crop population, replanting on vacant spaces has to be done. This practice is not always possible, as during the dry season, when sugar harvesting occurs, there is not enough moisture in the soil for efficient germination. Replanting means additional labor, additional tons of sugar cane seed, and additional fertilizer. If soil conditions permit, and replanted seed has good germination and growth, uniform maturity is still never obtained at the next harvest; replanted spots mature later. Vacant spaces impossible to replant are liable to encourage weed growth, which requires extra control efforts, and the weeds, if not eliminated, compete with the surrounding sugar cane for sunlight, food and water. Uprooted spots sometimes account for as much as 30 to 40% field population, with a corresponding reduction of sugar cane production.

In operating the sugar cane cutting blade of the prior harvesting machines, frequently high stumps, several inches high are left above the soil. This means that part of the crop has been left in the field without being harvested, and the uncut part is that which yields the most sugar. Efficient ratoon germination for the next crop only occurs through cutting the sugar cane stems close to the ground without severing the roots. Bud germination on nodes above the soil surface will have no root development and will die with no root nutrition. Elimination of stumps after mechanical harvesting is now a standard practice in domestic sugar cane producing areas. The device used for stump elimination is known as a "stubble shaver." This device is itself a disc or revolving blade operated from a tractor, similar to the disc or blade employed in a sugar cane harvesting machine.

In the currently employed stubble shavers, there is no guarantee of even recutting of the stumps without uprooting sugar cane stools, as their control likewise depends on visual observation and manual adjustment of the height of the blade.

Some harvesting machines on the market utilize two operators, one to drive the tractor and the other to control the height of the stem cutting blade. This means additional labor cost. Also, part of the efficiency of the machine is lost by the need to exert this control.

It will therefore be apparent that there is a great need for a non-soil penetrating sugar cane harvesting blade assembly, and that such a non-soil penetrating assembly is essential for stubble shaving. A prime purpose of the present invention is therefore to fill this need.

A further object of the invention is therefore to provide an improved sugar cane harvesting blade assembly which minimizes the necessity for replanting and which efficiently performs stubble shaving, and wherein the harvesting blade assembly can be adapted to practically all present types of sugar cane harvesting machines and can be used for stubble shaving as well as sugar cane harvesting.

A stil further object of the invention is to provide an improved sugar cane harvesting blade assembly wherein the cutting blade will always operate at a definite predetermined distance above the soil and will never penetrate under the sugar cane roots, wherein the tractor operator is not required to adjust or otherwise attend to control of the blade height, wherein the efficiency of harvesting will minimize the need for stubble shaving, and wherein uneven or sloping terrain does not affect or interfere with the desired cutting height.

A still further object of the invention is to provide an improved non-soil penetrating harvesting blade assembly which can be employed to harvest any type of row crops wherein it is desired to eliminate or harvest stems and/or foliage without serving or damaging the plant roots.

Further objects and advantages of the invention will become apparent from the following description and claims, and from the accompanying drawings, wherein:

FIG. 3 is an enlarged fragmentary top plan view taken substantially on line 3—3 of FIG. 2 and showing one of the harvesting blade assemblies according to this invention.

FIG. 5 is a vertical cross-sectional view taken substantially on line 5—5 of FIG. 4.

FIG. 6 is a bottom view of the harvesting cutter assembly of FIGS. 3 to 5.

FIG. 8 is a fragmentary top plan view of the top portion of a modified form of harvesting cutter assembly according to the present invention.

FIG. 9 is a elevational view of the structure shown in FIG. 8.

FIG. 10 is an elevational view similar to FIG. 9 but showing the top portion of another modified form of harvesting cutter assembly according to the present invention.

Figure 1:
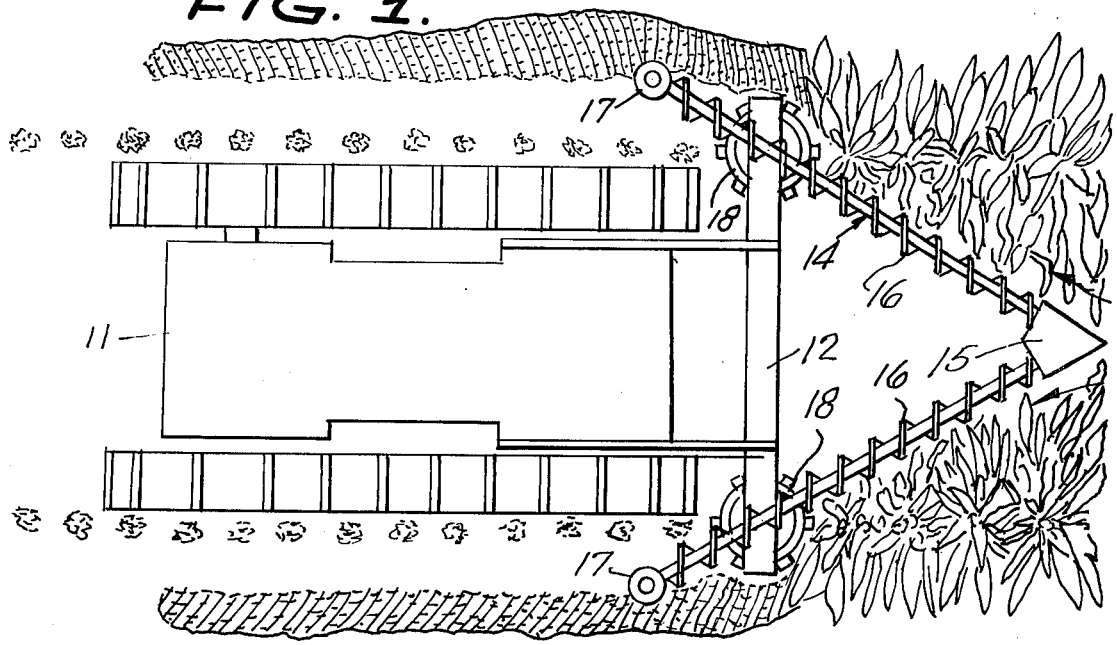
FIG. 1 is a top plan view of a sugar cane harvesting tractor provided with non-soil penetrating harvesting blade assemblies in accordance with the present invention.
Figure 2:
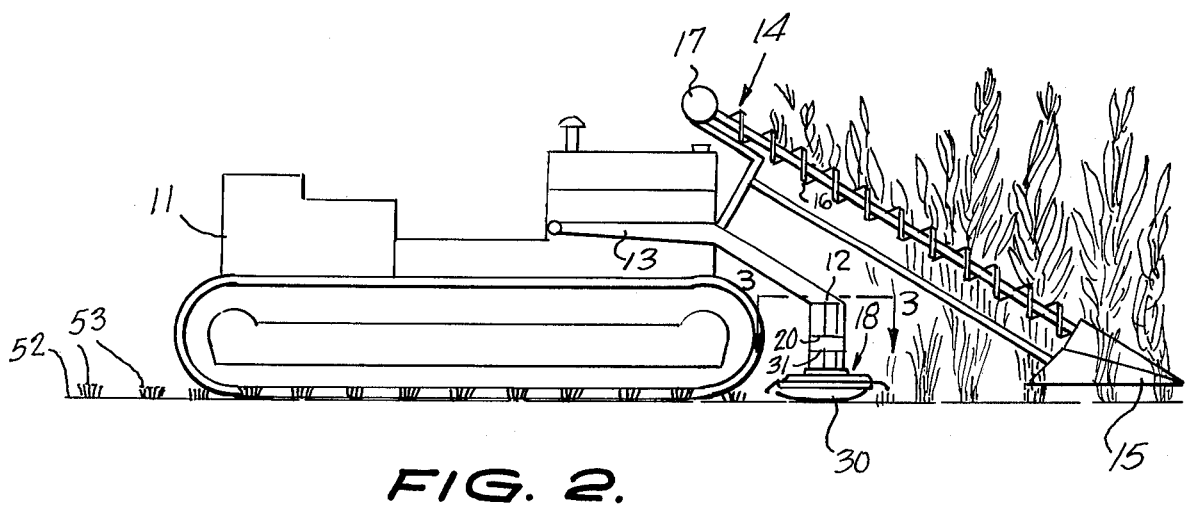
FIG. 2 is a side elevational view of the sugar cane harvesting tractor of FIG. 1.

Referring to the drawings, 11 designates a tractor having a transverse tool bar 12 which is pivotally supported in front of the tractor by conventional boom means 13, shown in lowered working position in FIGS. 1 and 2. Suitably supported on said boom means is a conventional stalk lifting mechanism 14 which raises stalks from the ground and guides them sidewards in a conventional manner for efficient sugar cane cutting. The lifting mechanism 14 includes a front plow member 15 and rearwardly divergent upwardly and rearwardly inclined auger members 16 driven by hydraulic motors 17. Secured to and depending from opposite end portions of tool bar 12 are respective harvesting cutter assemblies 18, constructed in accordance with the present invention.

As shown in FIGS. 3 to 7, each harvesting cutter assembly 18 comprises a supporting frame structure 19 defined by a horizontal top plate 20 and a horizontal bottom plate 21, said plates being of generally pentagonal shape having three right angled corners and being ridigly connected at said three corners by vertical bars 22. The frame structure 19 is rigidly secured in any suitable manner to the underside of tool bar 12.

Figure 7:
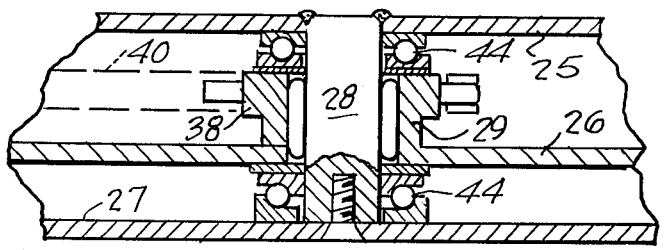
FIG. 7 is an enlarged vertical cross-sectional view taken substantially on line 7—7 of FIG. 5.

Rigidly secured to and depending from bottom plate 21 adjacent its right-angled corners are respective guide tubes 23. Said guide tubes 23 telescopically and slidably receive respective upstanding tubular post members 24 rigidly secured on a generally circular top housing member 25 for a rotary cutter disc 26. A generally circular bottom housing member 27 is provided below disc 26 and is coaxially connected to the top housing member 25 by a shaft member 28 rigidly secured to both top and bottom housing members 25, 27. The cutter disc 26 is journalled on shaft 28 by means or roller bearing assembly 29 and top and bottom ball bearing assemblies 44, as shown in FIG. 7. A ground-engaging skid member 30 is rigidly secured to and extends beneath the bottom housing member 27.

Figure 4:
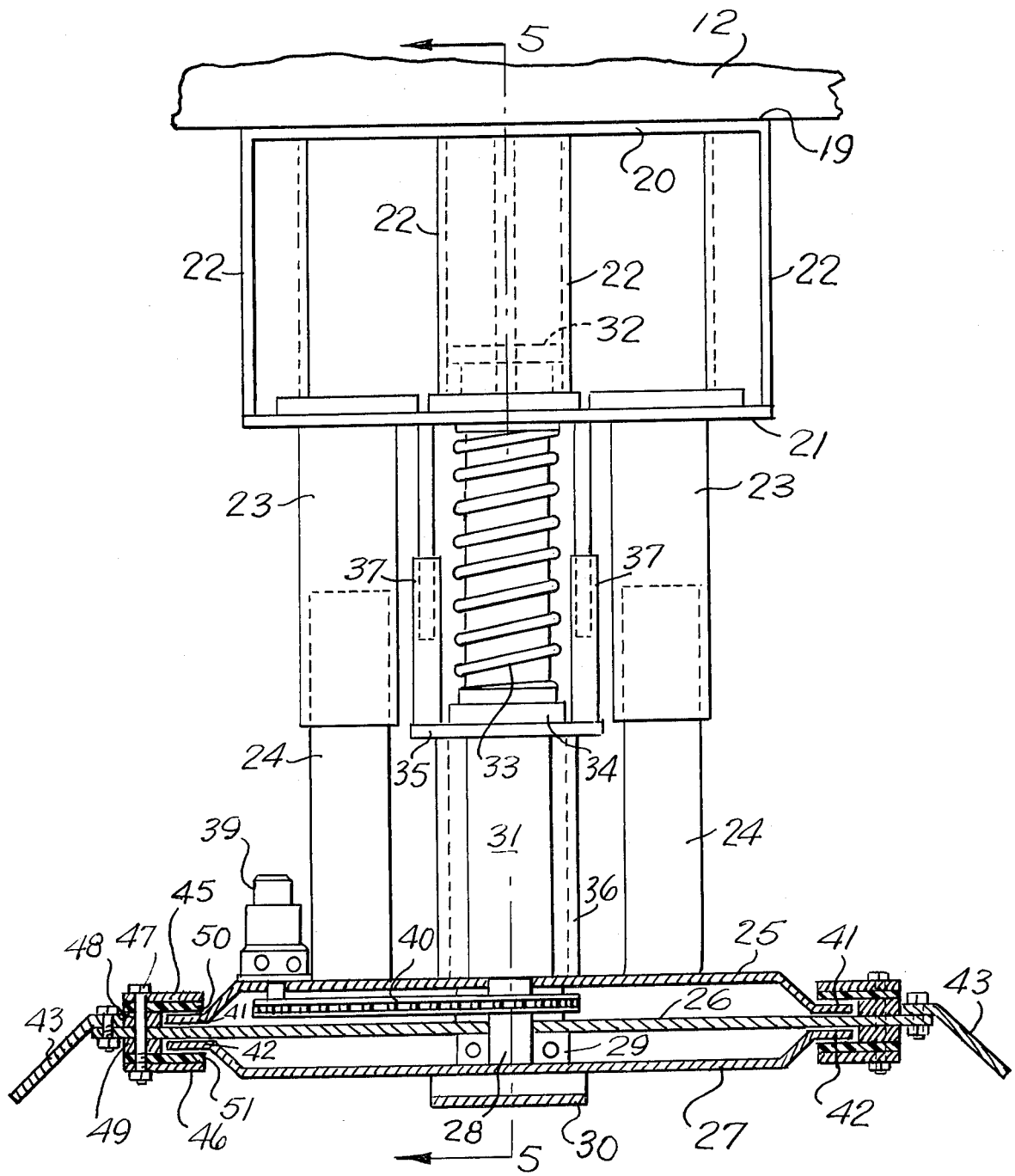
FIG. 4 is a vertical cross-sectional view taken substantially on line 4—4 of FIG. 3.

An upstanding hollow post member 31 is rigidly secured to top housing member 25 midway between the front post members 24, as viewed in FIG. 4, and extends slidably through an aperture provided therefor in plate member 21, the top end of post member 31 being provided with a retaining flange 32. A coiled spring 33 surrounds post member 31 and bears between the underside of plate member 21 and a bearing washer 34 supported on a top plate element 35 surrounding post member 31 and rigidly connected to top housing member 25 by an upstanding channel bar 36. Relative movement of the cutter blade housing structure with respect to the tool bar 12 is cushioned by a pair of shock absorber assemblies 37 connected between plate element 35 and plate member 21 on opposite sides of post member 31, as shown in FIG. 4.

A drive sprocket wheel 38 is rigidly secured on disc 26 below top housing member 25. A hydraulic motor 39 is mounted on top housing member 25 and its output shaft is drivingly coupled to sprocket wheel 38 by a sprocket chain 40.

Upper housing member 25 has a downwardly offset peripheral flange 41 and lower housing member 27 has an upwardly offset peripheral flange 42. The rotary disc 26 extends outwardly between the flanges 41,42. Rigidly secured to the exposed peripheral portion of the disc 26 are a plurality of equally spaced downwardly and outwardly inclined cutting blades 43. Asbestos-lined top and bottom flat annular guide rings 45, 46 are secured on the periphery of disc 26 by bolts 47 and are spaced respectively above flange 41 and below flange 42 by spacer rings 48 and 49. The annular asbestos linings 50,51 therefore act as heat-resistant guides to support the rotating peripheral portion of disc 26 relative to the top and bottom fixed housing members 25 and 27.

As shown in FIGS. 2 and 5, each skid member 30 extends in the direction of travel and is shaped so that it continuously engages the ground and supports the cutting blades 43 at the proper height above ground level, shown at 52, for most efficient cutting of the sugar cane, and this cutting height will be maintained even if the ground is irregular or is sloping, inasmuch as the biasing spring 33 of each cutter assembly 18 acts to maintain its associated skid member 30 always in ground contact. Therefore, in operation, as the associated tractor 11 moves forwardly along its path of travel for harvesting, the sugar cane stalks reached by the cutter assemblies 18 are cut at constant and correct height above ground level, leaving the uniform-height stumps 53 which are sufficiently short so that there is no need for "stubble shaving."

Any suitable number of cutting blades 43 may be employed on the cutter disc 26. The typical embodiment described herein employs six cutting blades.

In the modification illustrated in FIGS. 8 and 9, an upstanding post member 60 is centrally rigidly secured on the top housing member 25 and has diametrically opposed guide ribs 61. The tool bar 12 is formed with an aperture conforming with the cross-sectional shape of post member 60 and slidably and non-rotatively receiving same. A rectangular retaining plate 62 is rigidly secured to the top end of post member 60. A coiled spring 63 surrounds post member 60 and bears between tool bar 12 and housing member 25, biasing the cutter assembly downwardly relative to the tool bar. Cushioning shock absorber assemblies 23 are connected between the tool bar 12 and the housing member 25 to cushion the relative movements of the cutter assembly with respect to the tool bar, said shock absorber assemblies being located on opposite sides of the post member 60.

In the modification shown in FIG. 10, an upstanding post member 70 is centrally rigidly secured on the top housing member 25 and extends slidably through an aperture 71 provided therefor in tool bar 12. A retaining plate 72 is rigidly secured on the top end of post member 70. A coiled spring 73 surrounds post member 70 and bears between tool bar 12 and top housing member 25, biasing the cutter assembly downwardly. Upstanding guide pins 74 are rigidly secured on top housing member 25 on opposite sides of post member 70 and extend slidably through apertures 75 provided therefor in tool bar 12. The pins 74 are provided with top retaining cap nuts 76. A rectangular yoke member 77 is rigidly secured on tool bar 12 over the guide pins 74 and plate 72, and a shock absorber assembly 78 is connected between the top portion 79 of the yoke member and the plate member 72, acting to cushion relative movements of the cutter assembly with respect to the tool bar.

While FIGS. 1 and 2 show cutter assemblies 18 mounted on a tool bar 12 in front of the tractor 11 for sugar cane harvesting operation, such cutter assemblies may be mounted on a tool bar carried rearwardly of the tractor, for example, for stubble shaving operation if desired, within the spirit of the present invention. In either case, soil penetration is prevented, because the skid members 30 of the cutter assemblies hold the cutting blades 43 above ground level.

Furthermore, the non-soil penetrating cutter blade assemblies of the present invention may be employed to harvest any type of row crop wherein it is desired to cut or harvest stalks or similar foliage without severing or damaging the plant roots and wherein it is important to prevent soil penetration.

While certain specific embodiments of a non-soil penetrating harvesting machine for cutting sugar cane have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A harvesting cutter assembly comprising a tractor tool bar, generally horizontally extending housing means below the tool bar, a rotary cutter blade supporting disc journalled in said housing means with its peripheral portion extending outwardly from said housing means, cutting blade means on said peripheral portion, means to yieldably connect said housing means to the tractor tool bar and including means biasing said housing means downwardly, and ground-engaging skid means positioned underneath said supporting disc and on the bottom of said housing means and acting to limit the position of said cutting blade means to a substantially constant height above ground level while preventing said cutting blade means from penetrating the soil.

2. The harvesting cutter assembly of claim 1, and wherein said housing means has peripheral flanges above and below said disc, and means on the disc supportingly engaging said flanges.

3. The harvesting cutter assembly of claim 2, and wherein said flanges extend substantially parallel to the top and bottom surfaces of the disc and the means on the disc engaging said flanges comprises flat ring members concentrically secured to the disc and spaced to receive said flanges therebetween.

4. The harvesting cutter assembly of claim 3, and wherein said ring members are provided with frictional heat-resistant linings respectively slidably engaging said flanges.

5. A harvesting cutter assembly comprising a tractor tool bar, generally horizontally extending housing means below the tool bar, a rotary cutter blade supporting disc journalled in said housing means with its peripheral portion extending outwardly from said housing means, cutting blade means on said peripheral portion, means to yieldably connect said housing means to the tractor tool bar and including means biasing said housing means downwardly, and ground-engaging skid means on the bottom of said housing means and acting to limit the position of said cutting blade means to a substantially constant height above ground level, and wherein said housing means comprises top and bottom generally concave opposing housing members and central shaft means rigidly connecting the central portions of said opposing housing members, said rotary cutter blade supporting disc being journalled on said shaft means, drive motor means on the top housing member, and means drivingly coupling said drive motor means to said cutter blade supporting disc.

6. The harvesting cutter assembly of claim 5, and wherein the means to yieldably connect said housing means to the tractor tool bar includes interengaging coacting guiding means extending between the tool bar and the housing means and substantially constraining the housing means to move in a direction perpendicular to the tool bar.

7. The harvesting cutter assembly of claim 6, and wherein said coacting guide means comprises depending members on the tool bar and upstanding members on the housing means telescopically interengaging with said depending members.

8. The harvesting cutter assembly of claim 6, and wherein said coacting guide means comprises upstanding pin means on the housing means slidably engaging through said tool bar.

9. The harvesting cutter assembly of claim 6, and at least one shock absorber assembly connected between the housing means and the tool bar to cushion relatuve movements thereof.

10. The harvesting cutter assembly of claim 6, and wherein the means biasing said housing means downwardly comprises an upstanding post element on said top housing member, a coiled spring surrounding said post element, and bearing means to transmit biasing force generated by said spring downwardly from the tool bar to said top housing member.

11. The harvesting cutter assembly of claim 10, and wherein said bearing means includes a top frame connected to the bottom of said tool bar and including bottom plate means, said post element extending slidably through said plate means and lower bearing plate means surrounding said post element and being rigidly secured to said top housing member, said coiled spring bearing between said two plate means.

12. The harvesting cutter assembly of claim 11, and wherein said interengaging coacting guide means comprises telescopically-engaging elements secured respectively to said bottom plate means of the top frame and said top housing member and extending on an axis substantially perpendicular to said tool bar.

13. The harvesting cutter assembly of claim 11, and at least one shock absorber assembly connected between said bottom plate means of said top frame and said lower bearing plate means.

14. The harvesting cutter assembly of claim 11, and respective shock absorber assemblies connected on opposite sides of said post element between said bottom plate means of said top frame and said lower bearing plate means.

15. The harvesting cutter assembly of claim 11, and stop flange means on the top end of said post element limiting downward travel of said post element relative to said bottom plate means of the top frame.

* * * * *